(12) United States Patent
Bernat et al.

(10) Patent No.: US 11,416,295 B2
(45) Date of Patent: Aug. 16, 2022

(54) TECHNOLOGIES FOR PROVIDING EFFICIENT ACCESS TO DATA IN AN EDGE INFRASTRUCTURE

(71) Applicant: Intel Corporation, Santa Clara, CA (US)

(72) Inventors: Francesc Guim Bernat, Barcelona (ES); Karthik Kumar, Chandler, AZ (US); Suraj Prabhakaran, Aachen (DE); Timothy Verrall, Pleasant Hill, CA (US); Thomas Willhalm, Sandhausen (DE); Mark Schmisseur, Phoenix, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 341 days.

(21) Appl. No.: 16/563,171

(22) Filed: Sep. 6, 2019

(65) Prior Publication Data
US 2019/0391855 A1    Dec. 26, 2019

Related U.S. Application Data

(60) Provisional application No. 62/841,042, filed on Apr. 30, 2019.

(51) Int. Cl.
*G06F 9/50* (2006.01)
*G06F 16/27* (2019.01)
(Continued)

(52) U.S. Cl.
CPC .......... *G06F 9/5005* (2013.01); *G06F 9/50* (2013.01); *G06F 9/505* (2013.01); *G06F 9/5011* (2013.01); *G06F 9/5027* (2013.01); *G06F 9/5033* (2013.01); *G06F 9/5044* (2013.01); *G06F 9/5061* (2013.01); *G06F 9/5072* (2013.01); *G06F 9/5077* (2013.01); *G06F 9/5083* (2013.01); *G06F 9/5094* (2013.01); *G06F 16/2365* (2019.01); *G06F 16/27* (2019.01); *G06F 21/602* (2013.01); *G06F 21/62* (2013.01); *H04L 9/0637* (2013.01); *H04L 9/0827* (2013.01); *H04L 9/3247* (2013.01);
(Continued)

(58) Field of Classification Search
None
See application file for complete search history.

(56) References Cited

U.S. PATENT DOCUMENTS 10,521,360 B1 *  12/2019  Gibson ............... G06F 12/1408
2012/0240204 A1 *  9/2012  Bhatnagar ............ G06F 21/30
                                                               726/5

(Continued)

*Primary Examiner* — Qing Yuan Wu
(74) *Attorney, Agent, or Firm* — Hanley, Flight & Zimmerman, LLC

(57) ABSTRACT

Technologies for providing efficient data access in an edge infrastructure include a compute device comprising circuitry configured to identify pools of resources that are usable to access data at an edge location. The circuitry is also configured to receive a request to execute a function at an edge location. The request identifies a data access performance target for the function. The circuitry is also configured to map, based on a data access performance of each pool and the data access performance target of the function, the function to a set of the pools to satisfy the data access performance target.

25 Claims, 11 Drawing Sheets

(51) Int. Cl.
  *G06F 21/62*     (2013.01)
  *G06F 16/23*     (2019.01)
  *H04L 9/06*      (2006.01)
  *H04L 9/32*      (2006.01)
  *H04L 41/12*     (2022.01)
  *H04L 47/70*     (2022.01)
  *H04L 67/52*     (2022.01)
  *H04L 67/60*     (2022.01)
  *G06F 21/60*     (2013.01)
  *H04L 9/08*      (2006.01)

(52) U.S. Cl.
  CPC .............. *H04L 41/12* (2013.01); *H04L 47/82* (2013.01); *H04L 67/18* (2013.01); *H04L 67/32* (2013.01); *H04L 2209/38* (2013.01)

(56) References Cited

U.S. PATENT DOCUMENTS

2017/0359843 A1* 12/2017 Bell .................. H04W 28/0236
2019/0372837 A1* 12/2019 Yang ....................... H04L 43/08
2021/0326185 A1* 10/2021 Opsenica ............ H04L 41/0896

* cited by examiner

TECHNOLOGIES FOR PROVIDING EFFICIENT ACCESS TO DATA IN AN EDGE INFRASTRUCTURE

CROSS-REFERENCE TO RELATED APPLICATION

The present application claims the benefit of U.S. Provisional Patent Application No. 62/841,042, filed Apr. 30, 2019.

BACKGROUND

Co-locating compute resources at an "edge" of a network (e.g., closer to users) enables internet of things (IoT) and sensor devices to be able to operate within real-time requirements, enabling a new class of computing that was previously not possible. For example, disaster alert information typically requires a response time of 10 milliseconds, but augmented reality and autonomous driving usages require a response time of one millisecond. By contrast, the time that elapses for a simple ping to a remote server is about 100 milliseconds. Clearly, only the edge can provide the low-latency response times needed for the above use cases. However, even at the edge, it may be possible that some applications that have more stringent latency requirements fail to satisfy those requirements while other applications, with less stringent latency requirements comfortably satisfy them. A major contributor to the latency associated with an application is the speed and bandwidth with which data is accessed by the compute resources at the edge. Presently, the solution to avoid failing to satisfy the performance targets of applications at the edge is to maintain the data access resources (e.g., memory and/or data storage resources) at a low load (e.g., operating at 50% of available capacity), which typically results in significant underutilization (e.g., waste) of the data access resources.

Furthermore, it is important for compute, memory, and storage resources at an edge location (e.g., a base station, a cell tower, a street cabinet, etc.) to be able to perform operations and host data that requires security (e.g., encryption). While an encryption key may be utilized to perform cryptographic operations on data utilized by a function (e.g., an application) executed on behalf of a user at an edge location, the edge may have hundreds or even thousands of concurrent streams of data associated with different users. Each stream may require secure storage of a private key, which is problematic as the data access resources (e.g., memory resources, data storage resources) at edge locations are more limited (e.g., in number, in capacity, etc.) than in typical data centers (e.g., at the core of a network).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
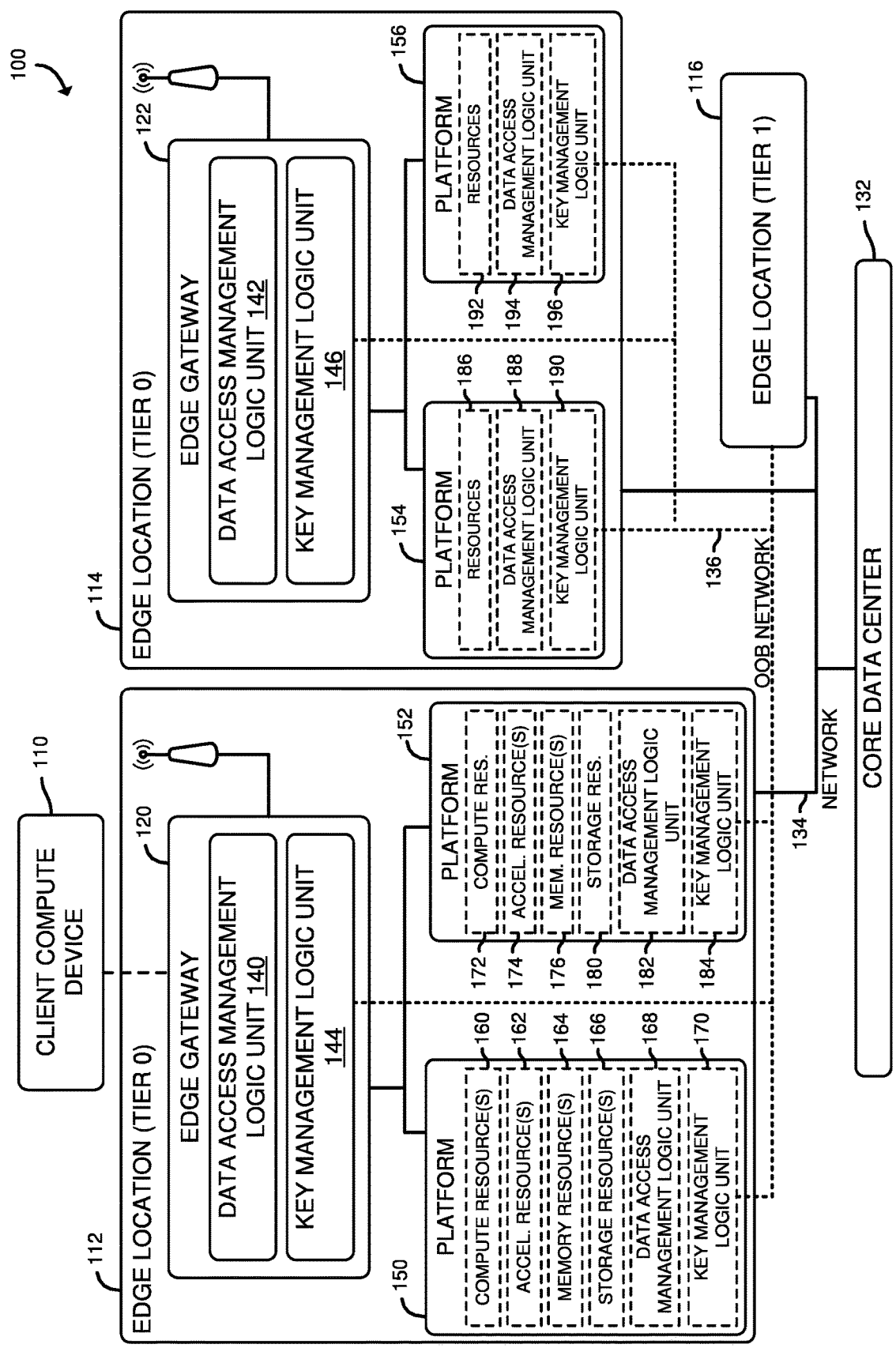
FIG. 1 is a simplified diagram of at least one embodiment of a system for providing efficient access to data in an edge infrastructure.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. Furthermore, the disclosed embodiments may be initially encoded as a set of preliminary instructions (e.g., encoded on a machine-readable storage medium) that may require preliminary processing operations to prepare the instructions for execution on a destination device. The preliminary processing may include combining the instructions with data present on a device, translating the instructions to a different format, performing compression, decompression, encryption, and/or decryption, combining multiple files that include different sections of the instructions, integrating the instructions with other code present on a device, such as a library, an operating system, etc., or similar operations. The preliminary processing may be performed by the source compute device (e.g., the device that is to send the instructions), the destination compute device (e.g., the device that is to execute the instructions), or an intermediary device. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for providing efficient access to data in an edge infrastructure includes a client compute device 110 in communication with an edge gateway 120. The edge gateway 120, in the illustrative embodiment, may be embodied as one or more physical compute devices or a virtualized system (e.g., one or more functions executed in a virtualized environment(s), such as virtual machine(s) or container(s), in which the underlying hardware resources appear as physical hardware to software executing in the virtualized environment(s), but are separated from the software by an abstraction layer). The edge gateway 120, in operation, is configured to identify, for a function that is to be executed on behalf of a user (e.g., for the client compute device 110), a data access performance target for the function. The data access performance target may be a latency target indicative of a maximum amount of time that may elapse for a set of data to be accessed from a data access resource, such as a memory resource or data storage resource, a bandwidth target indicative of a speed, such as 20 Gb/s, at which data should be communicated from and to a data access resource, and/or a data resiliency target indicative of a level of resiliency that data associated with the function should have, such as resiliency to corruption or loss of the data.

The edge gateway 120, in operation, also determines the availability of pools of resources, such as in multiple platforms 150, 152 at an edge location 112 (e.g., a base station, a cell tower, etc.) and maps the function onto a set of the pools of resources to satisfy the performance target. In doing so, the edge gateway 120 may combine the capabilities of multiple pools of resources to satisfy the performance target (e.g., by combining two pools of memory resources, each having a bandwidth of 10 Gb/s to obtain a total data access bandwidth of 20 Gb/s, replicating data associated with the function across multiple memory or data storage resources (e.g., in different failure domains) to satisfy a data resiliency target, etc.). The edge gateway 120 may also provide data to one or more of the pools of resources that are usable to configure the resources (e.g., a prioritization scheme that indicates how to prioritize data access requests associated with the function relative to data access requests associated with other functions, an amount of bandwidth (e.g., in a virtualized communication path, referred to herein as a lane) to allocate to requests associated with the function, etc.). To do so, in the illustrative embodiment, the edge gateway 120 includes a data access management logic unit 140, which may be embodied as any device or circuitry (e.g., a co-processor, reconfigurable circuitry, a field programmable gate array (FPGA), an application specific integrated circuit (ASIC), etc.) or software configured to perform the above operations (e.g., identification of a data access performance target of a function, identification of available resources in pools of resources the edge location, mapping of the function to the pools of resources to satisfy the performance target), thereby offloading those operations from a general purpose processor of the edge gateway 120.

Additionally, the edge gateway 120, in operation, may facilitate the management of cryptographic keys, referred to herein as tenant keys, which are usable to perform cryptographic operations on data associated with a function performed on behalf of a user (e.g., the client compute device 110). While only one client compute device 110 is shown in FIG. 1 for simplicity, the number of client compute devices that may utilize the resources at the edge location 112 may number in the hundreds or thousands, or more, and storage of the corresponding tenant keys may use a significant amount of data storage capacity that could otherwise be used to perform the requested function(s) on the data (e.g., training a neural network, producing an inference with a neural network, identifying objects in images or videos provided by the client compute device 110, etc.). In facilitating the management of the tenant keys, the edge gateway 120 may maintain a cache of tenant keys that may be associated with a present tier (e.g., the devices at the present edge location 112 and one or more other edge locations, such as the edge location 114) and may selectively add tenant keys to and evict tenant keys from the cache on an as needed basis, rather than storing all tenant keys in the cache. In adding or evicting a tenant keys, the edge gateway 120 may send or retrieve tenant keys to or from one or more devices in other edge locations 114, 116 in the same tier (e.g., tier 0) or in a different tier (e.g., tier 1, which may be closer to a core of the network 134) through a secure, out of band network 136 (e.g., a network dedicated to communicating tenant key data and that is not also utilized to send non-tenant key data). In the illustrative embodiment, the edge gateway 120 includes a key management logic unit 144, which may be embodied any device or circuitry (e.g., a co-processor, reconfigurable circuitry, a field programmable gate array (FPGA), an application specific integrated circuit (ASIC), etc.) or software configured to perform the above tenant key management operations, thereby offloading those operations from a general purpose processor of the edge gateway 120. That is, in the illustrative embodiment, communication between the different tiers to move data up and down is done via a secured channel (e.g., the out of band network 136), which uses private and public keys from each platform key management logic unit. Hence, each key management logic unit has its own private key to decrypt the keys coming from other platforms and each key management logic has unit its own public keys to encrypt keys that are to be sent to other platforms.

Each platform 150, 152 may be embodied as a pool of resources that may be utilized to execute functions on behalf of client compute devices (e.g., the client compute device 110) upon request (e.g., in a function as a service (FaaS), or accelerated function as a service (AFaaS) model). As such, in the illustrative embodiment, the platform 150 includes a set of compute resources 160 (e.g., general purpose processor(s)), accelerator resources 162 (e.g., accelerator devices, such as field programmable gate arrays (FPGAs), graphics processing units (GPUs), vision processing units (VPUs), application specific integrated circuits (ASICs), etc.), memory resources 164 (e.g., volatile and/or non-volatile memory devices), and data storage resources 166 (e.g., solid state drives, hard disk drives, or other non-volatile storage devices, etc.). Additionally, in the illustrative embodiment, the platform 150 includes a data access management logic unit 168 and a key management logic unit 170, similar to the data access management logic unit 140 and the key management logic unit 144 described above. The platform 152 at the edge location 112 may also include compute resources 172, accelerator resources 174, memory resources 176, storage resources 180, a data access management logic unit 182, and a key management logic unit 184, similar to those described above with reference to the platform 150 and the edge gateway 120. Importantly, the platform 152 may have different amounts or types of certain resources compared to the platform 150 (e.g., lower latency memory resources or data storage resources, more accelerator resources, compute resources or accelerator resources that are more closely coupled to memory resources, etc. or vice versa). Further, while two platforms 150, 152 are shown for simplicity, it should be understood that the edge location 112 may include a different number of platforms.

The edge location 114, in the illustrative embodiment, includes an edge gateway 122 that includes a data access management logic unit 142, similar to the data access management logic unit 140, and a key management logic unit 146, similar to the key management logic unit 144. Additionally, the edge gateway 122 is communicatively connected to multiple platforms 154, 156. The platform 154, in the illustrative embodiment, includes resources 186, similar to the resources 160, 162, 164, 166, a data access management logic unit 188, similar to the data access management logic unit 168, and a key management logic unit 190, similar to the key management logic unit 190. Additionally, the platform 156 includes resources 192, similar to the resources 172, 174, 176, 180, a data access management logic unit 194, similar to the data access management logic unit 182, and a key management logic unit 196, similar to the key management logic unit 184. In the illustrative embodiment, the edge location 116, which is connected to the edge locations 112, 114 (e.g., through the out of band network 136), includes components similar to the edge locations 112, 114 described above.

As referenced above, the client compute device 110, the edge gateways 120, 122, and the platforms 150, 152, 154, 156, in the illustrative embodiment, are positioned at one or more locations (e.g., in small cell(s), base station(s), etc.) along the edge (e.g., in an edge network) of a cloud. An edge network may be embodied as any type of network that provides edge computing and/or storage resources which are proximately located to radio access network (RAN) capable endpoint devices (e.g., mobile computing devices, Internet of Things (IoT) devices, smart devices, etc.). In other words, the edge network is located at an "edge" between the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Accordingly, the edge network can provide a radio access interface to enterprise applications (e.g., housed in a remote cloud, data center, etc.) and/or other network-based services, as well as bring storage/compute resources closer to the endpoint devices. As some computations/processing can be performed at the edge networks, efficiencies such as reduced latency, bandwidth, etc., can be realized (i.e., relative to such computations/processing being performed at a remote cloud, data center, etc.). Depending on the intended purpose/capabilities of the edge network, the edge network may include one or more edge computing devices, which may include one or more gateways, servers, mobile edge computing (MEC) appliances, etc. It should be appreciated that, in some embodiments, the edge network may form a portion of or otherwise provide an ingress point into a fog network (e.g., fog nodes), which may be embodied as a system-level horizontal architecture that distributes resources and services of computing, storage, control and networking anywhere between a core data center 132 and an endpoint device (e.g., the client compute device 110).

Figure 2:
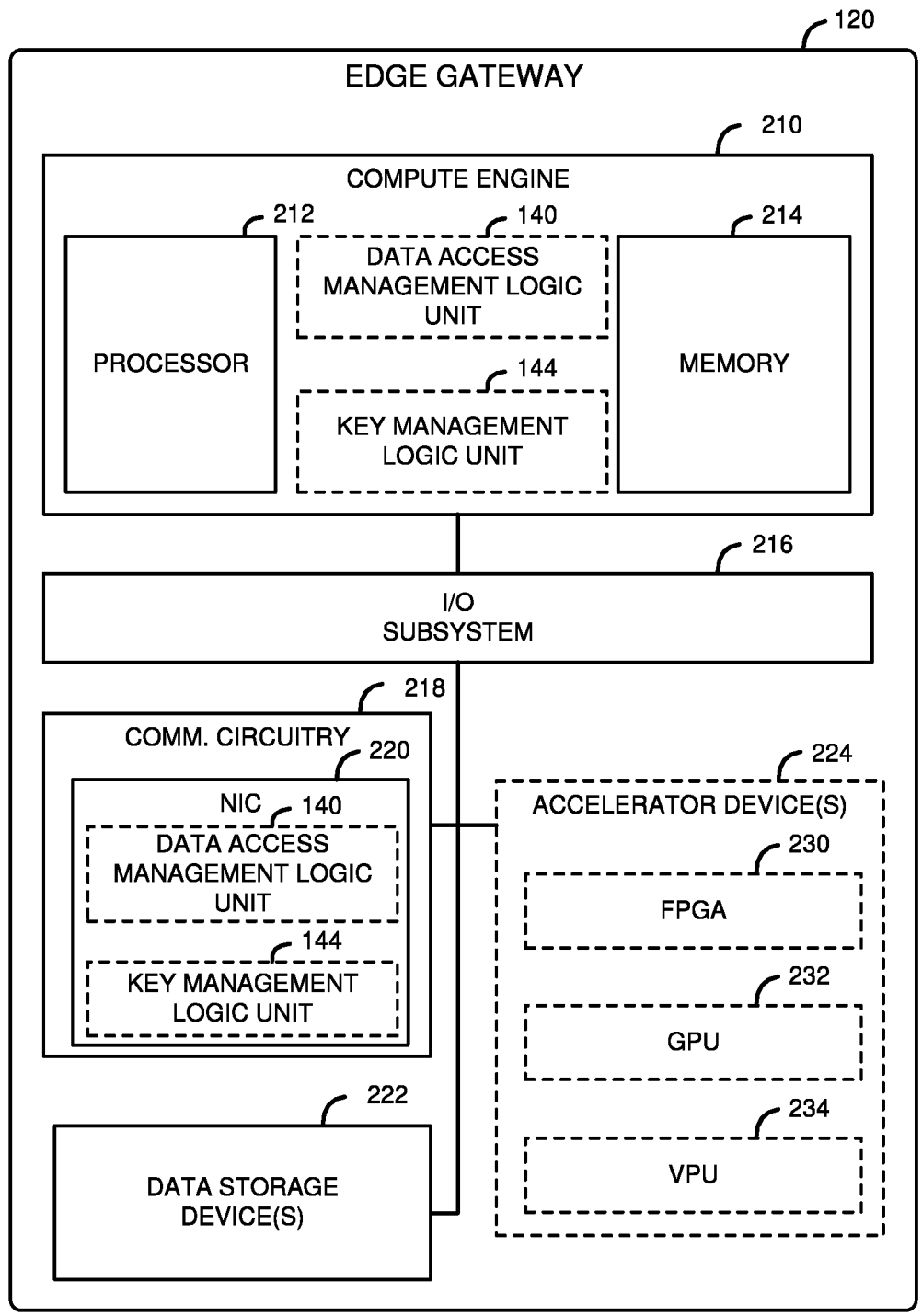
FIG. 2 is a simplified block diagram of at least one embodiment of an edge gateway included in the system of FIG. 1.

Referring now to FIG. 2, the illustrative edge gateway 120 includes a compute engine (also referred to herein as "compute engine circuitry") 210, an input/output (I/O) subsystem 216, communication circuitry 218, and one or more data storage devices 222. The edge gateway 120 may also include one or more accelerator devices 224. Of course, in other embodiments, the edge gateway 120 may include other or additional components, such as those commonly found in a computer (e.g., a display, peripheral devices, etc.). Additionally, in some embodiments, one or more of the illustrative components may be incorporated in, or otherwise form a portion of, another component. The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. In the illustrative embodiment, the compute engine 210 includes or is embodied as a processor 212, a memory 214, the data access management logic unit 140, described above with reference to FIG. 1, and the key management logic unit 144, which is also described above with reference to FIG. 1. The processor 212 may be embodied as any type of processor capable of performing the functions described herein. For example, the processor 212 may be embodied as a multi-core processor(s), a microcontroller, or other processor or processing/controlling circuit. In some embodiments, the processor 212 may be embodied as, include, or be coupled to an FPGA, an application specific integrated circuit (ASIC), reconfigurable hardware or hardware circuitry, or other specialized hardware to facilitate performance of the functions described herein.

The main memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the main memory 214 may be integrated into the processor 212. In operation, the main memory 214 may store various software and data used during operation such as one or more applications, data operated on by the application(s), libraries, and drivers.

The compute engine 210 is communicatively coupled to other components of the edge gateway 120 via the I/O subsystem 216, which may be embodied as circuitry and/or components to facilitate input/output operations with the compute engine 210 (e.g., with the processor 212, the main memory 214, the data access management logic unit 140, and the key management logic unit 144) and other components of the edge gateway 120. For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the main memory 214, and other components of the edge gateway 120, into the compute engine 210.

The communication circuitry 218 may be embodied as any communication circuit, device, or collection thereof, capable of enabling communications over a network between the edge gateway 120 and another compute device (e.g., the client compute device 110, the platforms 150, 152, devices in other edge locations 114, 116, fog nodes, the core data center 132, etc.). The communication circuitry 218 may be configured to use any one or more communication technology (e.g., wired or wireless communications) and associated protocols (e.g., a cellular networking protocol, Wi-Fi®, WiMAX, Ethernet, Bluetooth®, etc.) to effect such communication.

The illustrative communication circuitry 218 includes a network interface controller (NIC) 220, which may also be referred to as a host fabric interface (HFI). The NIC 220 may be embodied as one or more add-in-boards, daughter cards, network interface cards, controller chips, chipsets, or other devices that may be used by the edge gateway 120 to connect with another compute device (the client compute device 110, the platforms 150, 152, devices in other edge locations 114, 116, fog nodes, the core data center 132, etc.). In some embodiments, the NIC 220 may be embodied as part of a system-on-a-chip (SoC) that includes one or more processors, or included on a multichip package that also contains one or more processors. In some embodiments, the NIC 220 may include a local processor (not shown) and/or a local memory (not shown) that are both local to the NIC 220. In such embodiments, the local processor of the NIC 220 may be capable of performing one or more of the functions of the compute engine 210 described herein. Additionally or alternatively, in such embodiments, the local memory of the NIC 220 may be integrated into one or more components of the edge gateway 120 at the board level, socket level, chip level, and/or other levels. In some embodiments, and as indicated in FIG. 2, the data access management logic unit 140 and/or the key management logic unit 144 may be included in the NIC 220.

The one or more illustrative data storage devices 222 may be embodied as any type of devices configured for short-term or long-term storage of data such as, for example, memory devices and circuits, memory cards, hard disk drives, solid-state drives, or other data storage devices. Each data storage device 222 may include a system partition that stores data and firmware code for the data storage device 222. Each data storage device 222 may also include one or more operating system partitions that store data files and executables for operating systems.

Each accelerator device 224 may be embodied as any device or circuitry configured to execute a set of operations faster than the processor 212 is capable of executing the operations. The accelerator device(s) 224 may include one or more field programmable gate arrays (FPGAs) 230, each of which may be embodied as a set (e.g., a matrix) of logic gates that can be configured to perform a set of operations according to a defined configuration (e.g., a bit stream). The accelerator device(s) 224 may additionally or alternatively include a graphics processing unit (GPU) 232, which may be embodied as any device or circuitry (e.g., a programmable logic chip, a processor, etc.) configured to perform graphics-related computations (e.g., matrix multiplication, vector operations, etc.). Additionally or alternatively, the accelerator device(s) 224 may include a vision processing unit (VPU) 234, which may be embodied as any device or circuitry (e.g., a programmable logic chip, a processor, etc.) configured to perform operations related to machine vision, machine learning, and artificial intelligence. Additionally or alternatively the accelerator device(s) 224 may include other types of devices, such as one or more application specific integrated circuits (ASICs). While the data access management logic unit 140 and the key management logic unit 144 are shown as being incorporated into the compute engine 210 or the NIC 220, in some embodiments, the data access management logic unit 140 and/or the key management logic unit 144 may be included as or implemented by an accelerator device 224.

The client compute device 110, the edge gateway 122, the platforms 150, 152, 154, 156, the edge location 116, and the core data center 132 may have components similar to those described in FIG. 2 with reference to the edge gateway 120. The description of those components of the edge gateway 120 is equally applicable to the description of components of the client compute device 110, the edge gateway 122, the platforms 150, 152, 154, 156, the edge location 116, and the core data center 132, with the exception that, in some embodiments, the data access management logic unit 140 and/or the key management logic unit 144 are not included in the client compute device 110. Further, it should be appreciated that any of the edge gateways 120, 122, the client compute device 110, the platforms 150, 152, 154, 156, the edge location 116, and the core data center 132 may include other components, sub-components, and devices commonly found in a computing device, which are not discussed above in reference to the edge gateway 120 and not discussed herein for clarity of the description. Further, it should be understood that one or more components of a compute device may be distributed across any distance, and are not necessarily housed in the same physical unit.

The client compute device 110, the edge gateways 120, 122, the platforms 150, 152, 154, 156, the edge location 116, fog nodes, and the core data center 132 are illustratively in communication via a network 134, which may be embodied as any type of wired or wireless communication network, or hybrids or combinations thereof, including global networks (e.g., the Internet), local area networks (LANs) or wide area networks (WANs), an edge network, a fog network, cellular networks (e.g., Global System for Mobile Communications (GSM), 3G, Long Term Evolution (LTE), Worldwide Interoperability for Microwave Access (WiMAX), etc.), a radio access network (RAN), digital subscriber line (DSL) networks, cable networks (e.g., coaxial networks, fiber networks, etc.), optical networks, or any combination thereof. The out of band network 136 may also be embodied as any type of wired or wireless communication network, or hybrids or combinations thereof, including global networks (e.g., the Internet), local area networks (LANs) or wide area networks (WANs), an edge network, a fog network, cellular networks (e.g., Global System for Mobile Communications (GSM), 3G, Long Term Evolution (LTE), Worldwide Interoperability for Microwave Access (WiMAX), etc.), a radio access network (RAN), digital subscriber line (DSL) networks, cable networks (e.g., coaxial networks, fiber networks, etc.), optical networks, or any combination thereof.

Figure 3:
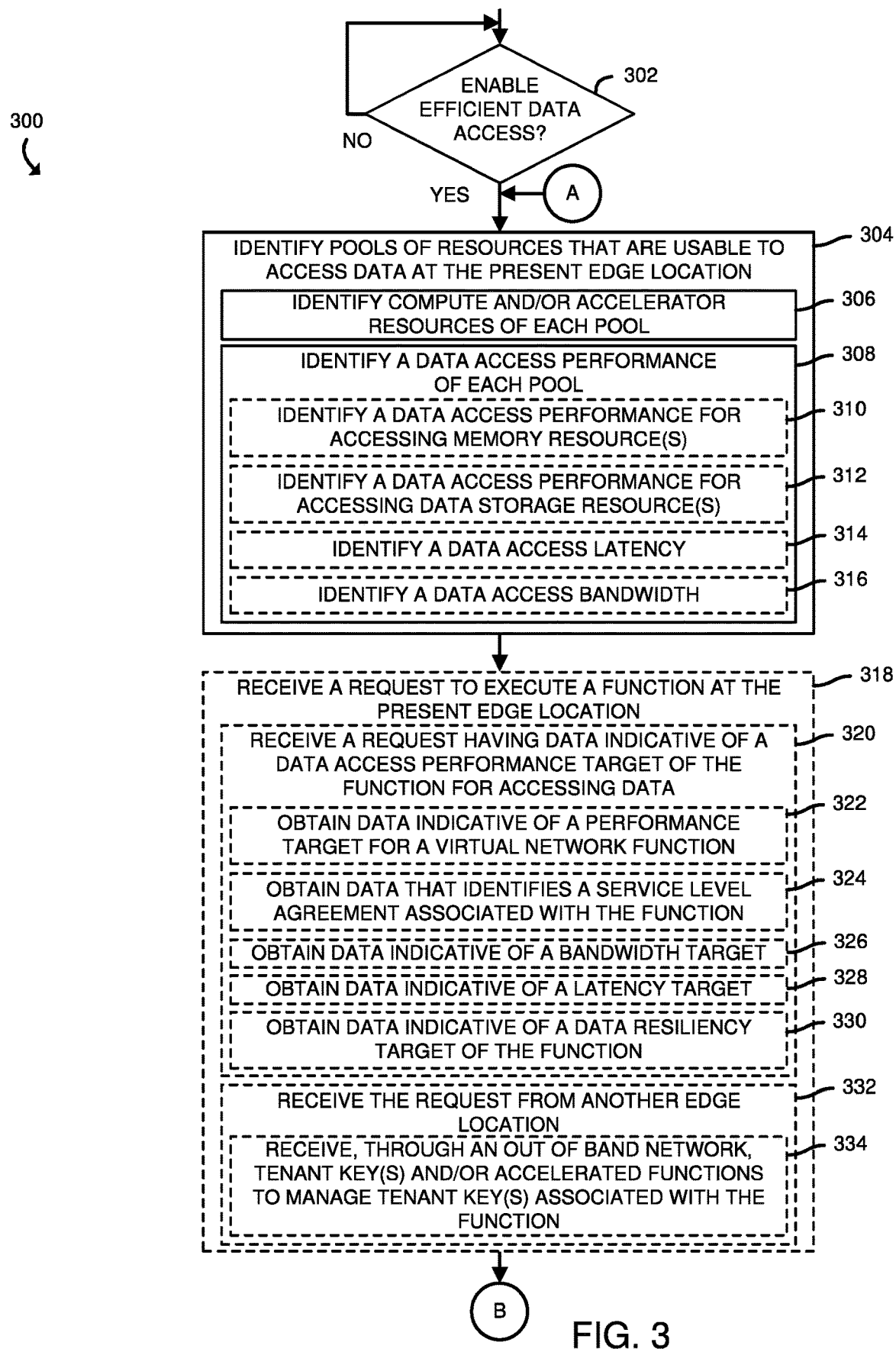
FIGS. 3-6 are simplified block diagrams of at least one embodiment of a method for providing efficient access to data in an edge infrastructure that may be performed by the edge gateway of FIG. 1.

Referring now to FIG. 3, the edge gateway 120, in operation, may execute a method 300 for providing efficient access to data (e.g., data utilized by a function executed as a service, tenant keys, etc.) in an edge infrastructure. The method 300 begins with block 302, in which the edge gateway 120 determines whether to enable efficient data access. In the illustrative embodiment, the edge gateway 120 may determine to enable efficient data access in response to a determination that the edge gateway 120 is equipped with the data access management logic unit 140 and/or the key management logic unit 144, in response to determining that a configuration setting (e.g., stored in a configuration file in a data storage device 222) indicates to enable efficient data access, and/or based on other factors. Regardless, in response to a determination to enable efficient data access, the method 300 advances to block 304 in which the edge gateway 120, in the illustrative embodiment, identifies pools of resources (e.g., the platforms 150, 152) that are usable to access data (e.g., to read and/or write data associated with a function to be executed on behalf of a client compute device, as a service) at the present edge location (e.g., the edge location 112). For example, the edge gateway 120 may query each device connected to the edge gateway 120 for identifiers and capabilities of the connected devices. In doing so, and as indicated in block 306, the edge gateway 120 may identify compute and/or acceleration resources of each pool (e.g., the compute resources 160, 172 and the accelerator resources 162, 174). Additionally, and as indicated in block 308, the edge gateway 120 identifies a data access performance (e.g., capability, provided by the available resources, to perform data access operations) of each pool (e.g., each platform 150, 152). In doing so, and as indicated in block 310, the edge gateway 120 may identify a data access performance for accessing memory resources (e.g., reading from and/or writing to the memory resources 164, 176). Additionally or alternatively, and as indicated in block 312, the edge gateway 120 may identify a data access performance for accessing data storage resources (e.g., reading from and/or writing the data storage resources 166, 180). In identifying a data access performance, the edge gateway 120 may identify a data access latency (e.g., an amount of time required to write to or read from a memory resource or data storage resource), as indicated in block 314. Similarly, in identifying a data access performance, the edge gateway 120 may identify a data access bandwidth (e.g., a number of bytes per second that can be written to or read from the memory resources or data storage resources available in each platform 150, 152), as indicated in block 316.

As indicated in block 318, the edge gateway 120 may receive a request (e.g., from the client compute device 110 or from another edge location 114), to execute a function at the present edge location 112 (e.g., to provide a function as a service). In doing so, and as indicated in block 320, the edge gateway 120 receives a request that includes data indicative of a data access performance target of the function (e.g., a target level of performance in accessing data for use by the function). As indicated in block 322, the edge gateway 120 may obtain data indicative of a performance target for a virtual network function (e.g., the function to be executed is a virtual network function). In some embodiments, in receiving the request, the edge gateway 120 may obtain data that identifies a service level agreement (e.g., a set of one or more performance targets to be satisfied in exchange for a defined amount of money) associated with the function to be executed, as indicated in block 324. Additionally or alternatively, the edge gateway 120 may obtain data indicative of a bandwidth target (e.g., an amount of bytes per second to be communicated in response to a data access request associated with the function), as indicated in block 326. Similarly, and as indicated in block 328, the edge gateway 120 may obtain data indicative of a latency target (e.g., a maximum amount of time that may elapse for a data access request associated with the function to be completed). In some embodiments, the edge gateway 120 may obtain data indicative of a data resiliency target of the function (e.g., an indication of a level of resiliency to corruption or loss that data associated with the function should have), as indicated in block 330. In some embodiments, the edge gateway 120 may receive the request from another edge location (e.g., one of the edge locations 114, 116), such as when the client compute device 110 is moving out of range of the requesting edge location and execution of the function should be migrated to the present edge location 112, as indicated in block 332. Relatedly, and as indicated in block 334, the edge gateway 120 may receive, through an out of band network (e.g., the out of band network 136), one or more tenant keys and/or accelerated functions (e.g., bit stream(s) defining the accelerated function(s) for managing the tenant key(s) associated with the requested function). Subsequently, the method 300 advances to block 336 of FIG. 4, in which the edge gateway 120 determines the subsequent course of action based on whether a request to execute a function was received (e.g., in block 318).

Figure 4:
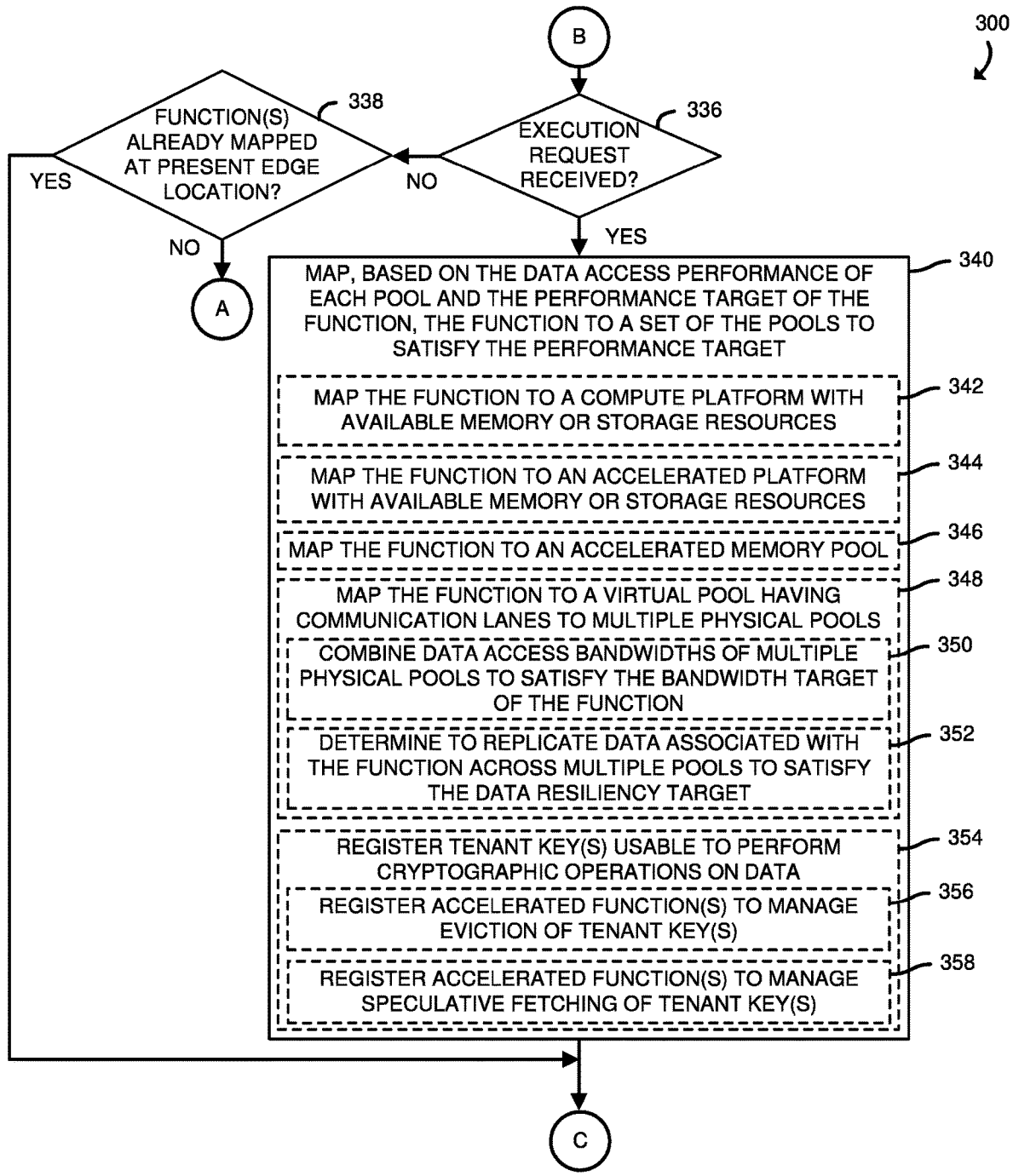

Referring now to FIG. 4, if the edge gateway 120 did not receive a request, the method 300 advances to block 338, in which the edge gateway 120 determines whether any functions have already been mapped (e.g., to one or more resource pools) at the edge location 112. If not, the method 300 loops back to block 304 of FIG. 3, in which the edge gateway 120 again identifies pools of resources that are usable to access data at the edge location 112 (e.g., the available resources may have changed). Referring back to block 336, if an execution request was received, the method 300 instead advances to block 340, in which the edge gateway 120 maps, based on the data access performance of each pool of resources at the present edge location 112 and the performance target of the function (e.g., the data access performance target from block 320 of FIG. 3), the function to a set of the pools (e.g., the platforms 150, 152) to satisfy the performance target. In doing so, the edge gateway 120 may map the function to a compute platform (e.g., a platform having one or more compute resources) with available memory resources or data storage resources, as indicated in block 342. Additionally or alternatively, the edge gateway 120 may map the function to an accelerated platform (e.g., a platform having one or more accelerator resources) with available memory resources or data storage resources, as indicated in block 344. In some embodiments, the edge gateway 120 may map the function to an accelerated memory pool, as indicated in block 346.

As indicated in block 348, the edge gateway 120 may map the function to a virtual pool (e.g., an abstraction that appears, to the function, as a physical pool, but is formed from portions of one or more physical resource pools) having communication lanes to multiple physical resource pools. In doing so, and as indicated in block 350, the edge gateway 120 may combine data access bandwidths of multiple physical resource pools to satisfy the bandwidth target (e.g., from block 326) of the function (e.g., combining memory resources 164 having a bandwidth of 10 Gb/s with memory resources 176, also having a bandwidth of 10 Gb/s to obtain a combined bandwidth of 20 Gb/s). Additionally, and as indicated in block 352, the edge gateway 120 may determine to replicate data associated with the function across multiple resource pools (e.g., across the data storage resources 166, 180) to satisfy the data resiliency target (e.g., from block 330). As indicated in block 354, the edge gateway 120 may register (e.g., configure the edge gateway 120 and the resource pools mapped to the function to utilize) one or more tenant keys that are usable to perform cryptographic operations (e.g., decryption, encryption, etc.) on data associated with the function. Additionally, the edge gateway 120 may register one or more accelerated functions (e.g., functions defined in bit streams usable to configure FPGA(s), etc.) to manage eviction, from a local cache, of tenant keys associated with the function, as indicated in block 356. Similarly, the edge gateway 120 may register one or more accelerated functions to manage speculative (e.g., predictive) fetching (e.g., from another edge location 114, 116) of tenant key(s). The edge gateway 120 may obtain the accelerated functions (e.g., bit streams or other data defining the accelerated functions) from the client compute device 110, from another edge location 114, 116 (e.g., in the case of migration of execution of the function), or from another source, as indicated in block 358. Subsequently, or if in block 338, the edge gateway 120 determined that one or more functions have already been mapped to resource pool(s) at the present edge location 112, the method 300 advances to block 360 of FIG. 5, in which the edge gateway 120 routes data access requests to resource pools (e.g., platforms 150, 152) mapped to the function.

Figure 5:
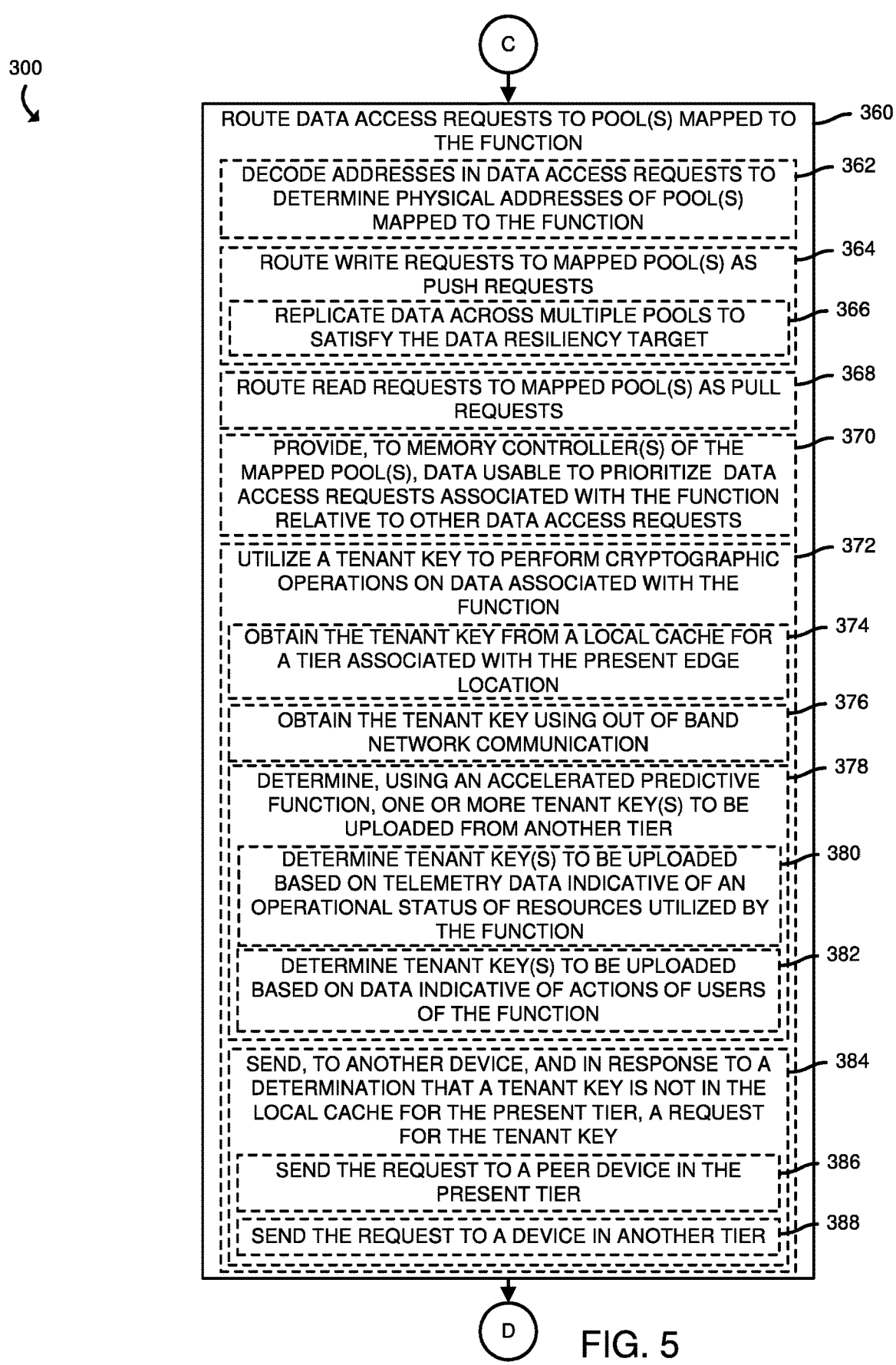

Referring now to FIG. 5, in routing data access requests, the edge gateway 120 may decode addresses in data access requests to determine the corresponding physical addresses of resource pools mapped to the function (e.g., utilize a table that identifies an address of a memory or data storage resource utilized by the function and the actual address of that memory or data storage resource), as indicated in block 362. As indicated in block 364, the edge gateway 120 may route write requests to one or more mapped resource pools as push requests. Further, and as indicated in block 366, the edge gateway 120 may replicate data associated with the function across multiple resource pools (e.g., the data storage resources 166, 180) to satisfy the data resiliency target. As indicated in block 368, the edge gateway 120 may route read requests to mapped resource pools as pull requests. Additionally, and as indicated in block 370, the edge gateway 120 may provide, to one or more memory controllers in the mapped resource pools, data usable to prioritize data access requests associated with the function relative to other data access requests (e.g., to allocate a corresponding amount of bandwidth in communication lanes to be utilized by the function, to satisfy a latency target, etc.). As indicated in block 372, the edge gateway 120 may utilize a tenant key to perform cryptographic operation(s) on data associated with the function. In doing so, and as indicated in block 374, the edge gateway 120 may obtain the tenant key from a local cache for a tier associated with the present edge location 112 (e.g., tier 0). As indicated in block 376, the edge gateway 120 may obtain the tenant key (e.g., from another edge location 114, 116) using out of band network communication (e.g., by communicating through the out of band network 136).

As indicated in block 378, the edge gateway 120 may determine, using an accelerated predictive function (e.g., from block 358) one or more tenant keys to be uploaded (e.g., retrieved) from another tier (e.g., from tier 1). For example, the accelerated predictive function may determine that the tenant key will be needed within a predefined time period and, given that the tenant key is presently not in the local cache, the tenant key should be retrieved from another edge location (e.g., in another tier). As indicated in block 380, the edge gateway 120 may determine one or more tenant keys to be uploaded based on telemetry data indicative of an operations status of resources utilized by the function (e.g., the accelerated function may identify a pattern in resource utilizations that typically occurs prior to the tenant key being needed to perform cryptographic operations). Additionally or alternatively, the edge gateway 120 may determine one or more tenant keys to be uploaded based on data indicative of actions of users of the function (e.g., the function typically performs operation B after the function has performed operation A for a user, and function B relies on decryption of data using a tenant key that is not presently in the local cache), as indicated in block 382. As indicated in block 384, the edge gateway 120 may send, to another device, and in response to a determination that a tenant key is not in the local cache for the present tier (e.g., tier 0), a request for the tenant key. In doing so, and as indicated in block 386, the edge gateway 120 may send the request to a peer device (e.g., to a device 122, 154, 156 in the edge location 114) in the present tier (e.g., tier 0, the tier in which the edge gateway 120 is located). In some embodiments (e.g., if the needed tenant key is not in the present tier), the edge gateway 120 may send the request to a device in another tier (e.g., to an edge gateway or other device in tier 1), as indicated in block 388.

Figure 6:
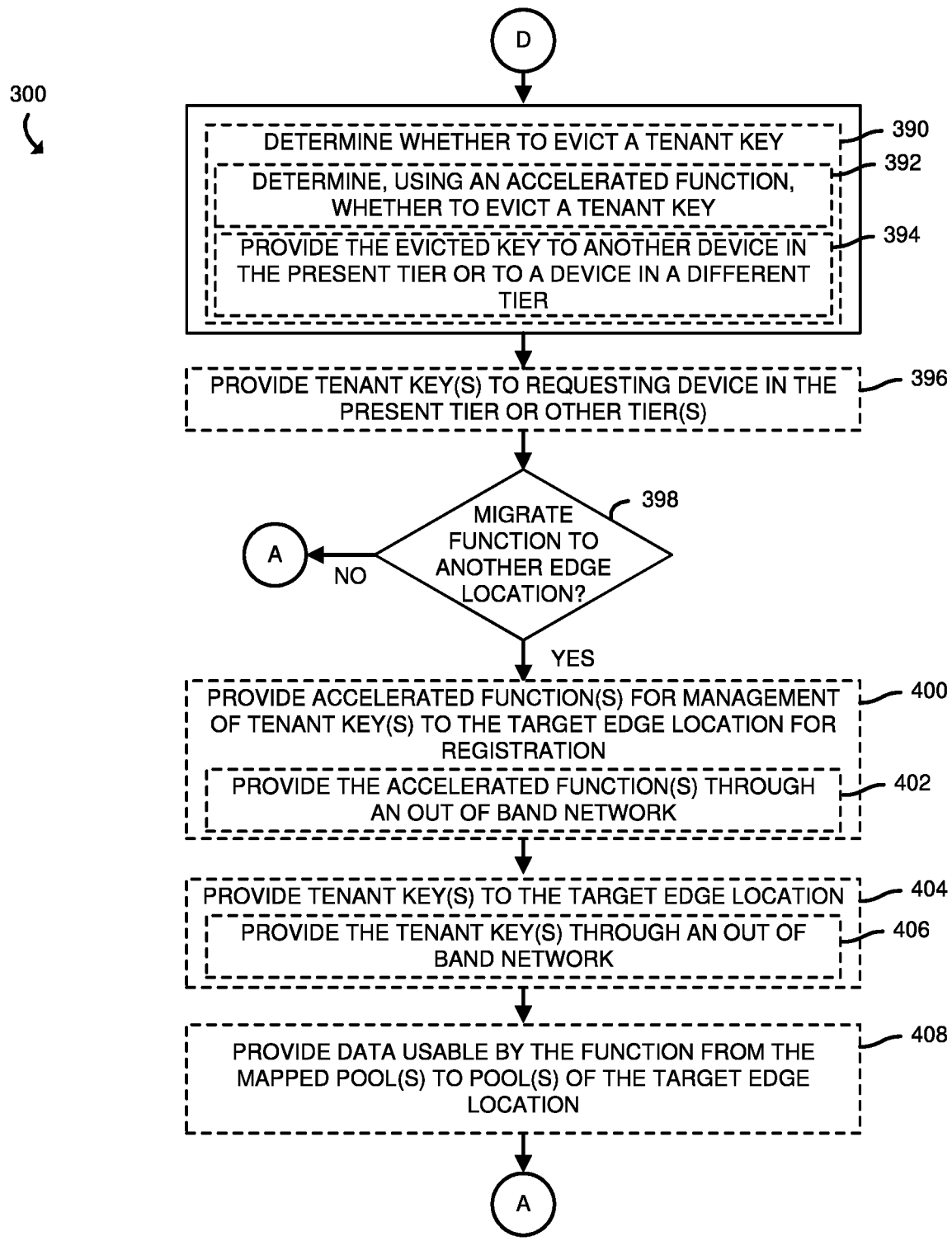

Referring now to FIG. 6, the edge gateway 120 may additionally determine whether to evict a tenant key from the local cache, as indicated in block 390. In doing so, and as indicated in block 392, the edge gateway 120 may make the determination of whether to evict a tenant key using an accelerated function (e.g., the accelerated function registered in block 356). As indicated in block 394, the edge gateway 120 may provide the evicted key to another device in the present tier (e.g., tier 0) or to a device in a different tier (e.g., tier 1), such as by sending the tenant key thought the out of band network 136. The edge gateway 120 may provide one or more tenant keys to a requesting device (e.g., a device that affirmatively requested the tenant key(s)) in the present tier (e.g., tier 0) or another tier (e.g., tier 1), as indicated in block 396. In block 398, the edge gateway 120 determines the subsequent course of action based on whether the function is to be migrated to another edge location (e.g., the client compute device 110 is moving out of range of the edge location 112). If not, the method 300 loops back to block 304 of FIG. 3 to again identify the available resources at the present edge location and continue execution of the function. Otherwise (e.g., if the function is to be migrated), the method 300 advances to block 400, in which the edge gateway 120 may provide accelerated function(s) (e.g., the accelerated functions from blocks 356, 358) for management of tenant key(s) to the target edge location (e.g., the edge location that the function is to be migrated to) for registration at that edge location. In doing so, the edge gateway 120 may provide the accelerated function(s) (e.g., the bit streams or other data that defines the accelerated functions) through the out of band network 136, as indicated in block 402. Additionally, and as indicated in block 404, the edge gateway 120 may provide one or more tenant keys to the target edge location (e.g., the tenant keys utilized by the function). In doing so, in the illustrative embodiment, the edge gateway 120 provides the tenant keys through the out of band network 136, as indicated in block 406. As indicated in block 408, the edge gateway 120 may also provide, from the mapped pools at the present edge location 112 and to one or more pools of the target edge location, data used in the execution of the function (e.g., image data, video data, neural network training data, etc.). Subsequently, the method 300 loops back to block 304 of FIG. 3, in which the edge gateway 120 again identifies the resources available at the present edge location 112.

While the operations of the method 300 are shown in a particular order in FIGS. 3-6, it should be understood that the operations may be performed in a different order or concurrently. Further, while the operations are described as being performed by the edge gateway 120, in other embodiments, one or more of the operations of the method 300 may be performed by another device in the system 100 (e.g., another edge gateway 122, one or more of the platforms 150, 152, 154, 156, etc.).

Figure 7:
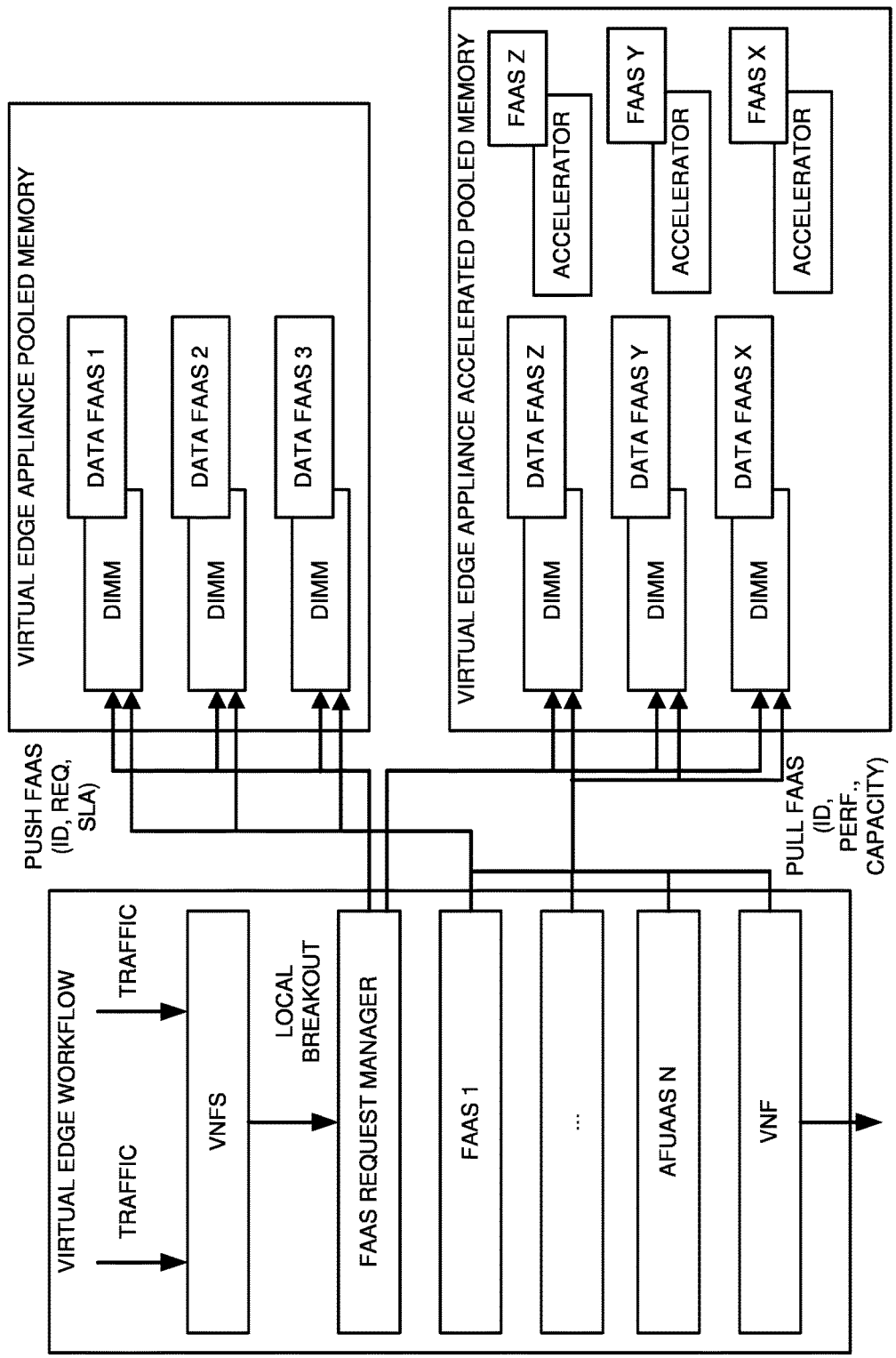
FIG. 7 is a simplified block diagram of at least one embodiment an architecture of the system of FIG. 1.
Figure 8:
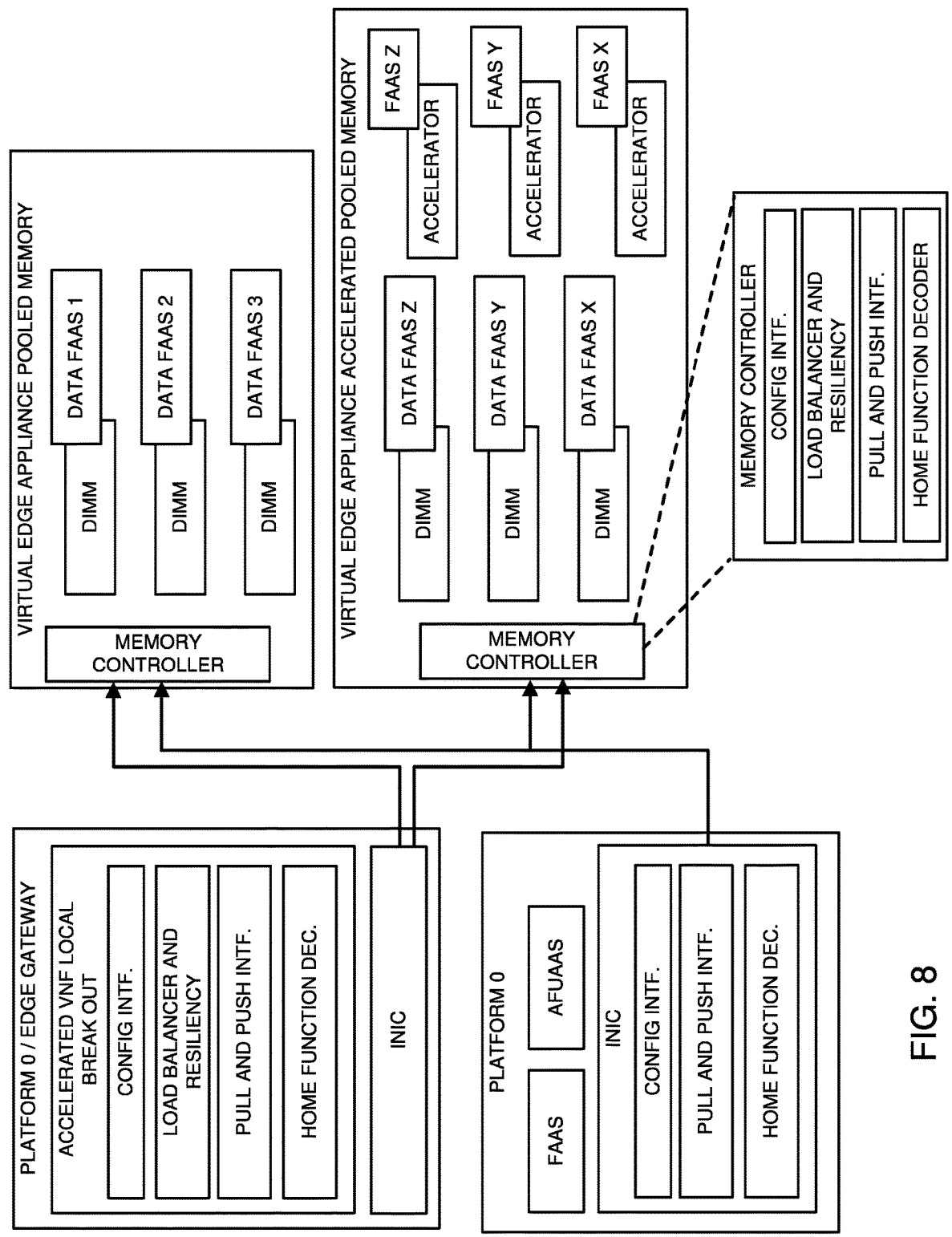
FIG. 8 is a simplified block diagram of at least one embodiment of an architecture of the system of FIG. 1 including subcomponents of platforms within the system.

Referring now to FIGS. 7 and 8, the architectures 700, 800 of the system 100 provide an element in the edge of the network that can determine where and how to push function as a service (FaaS) and accelerated function as a service (AFaaS) data, and the corresponding request(s), based on their performance target(s) (e.g., service level agreements). In the architectures, services (e.g., functions) may reside on (i) compute platforms; (ii) accelerated platforms (e.g., FPGAs); (iii) accelerated memory pools; and/or (iv) multiple platforms at the same time. For example, a function as a service that performs image transcoding may be provided by a compute platform (e.g., Platform A) with latency X, by an FPGA platform (e.g., Platform B) with latency X/4 and by an accelerated pooled memory with latency X/8 (e.g., because of the proximity of data to the compute and/or accelerator resources). As such, the architectures 700, 800 include logic in the edge gateway that allows mapping of a function to multiple memory pools (e.g., virtual memory pool(s)). Each of the pools has associated different types of compute or acceleration resources that may process requests with different levels of performance. Multiple pools may be mapped to one virtual FaaS pool depending on the performance requirements for that FaaS (e.g., four different memory pools may be needed to sustain a required bandwidth). Requests originating from edge devices are pushed to the corresponding pool based on their performance targets (e.g. service level agreement requirements).

Additionally, logic is included in the platforms that host the FaaS and AFaaS to expose interfaces to pull requests targeting those particular functions from the memory pools. A virtual memory pool may be mapped to multiple physical pools. In some embodiments, the network interface controllers in the system 100 may be extended in order to act as a first level of interface and as a first level of intelligence usable to distribute push and pull requests across the different pooled memory and data storage schemes in the architectures 700, 800. For example, the logic may be implemented in one or more FPGAs or cores of a processor within a network interface controller. The NIC may include configuration logic, load balancing logic, and resiliency logic that may be configured by a management device to perform load balancing or replication of requests to virtual pools, based on the configuration that a given connection has (e.g., a virtual pool replicated to multiple physical pools or distributed across multiple pools). Further, the network interface controller may include a home function decoder that, in operation, determines which virtual pool a particular virtual network function (VNF) is mapped to. For example, if a local VNF requests to push data to VNF 3, the home function decoder may determine the actual physical memory pools mapped to the virtual pool. Additionally, the network interface controller may include pull and push interfaces that can be used by VNFs or other services (e.g., running in a local processor or accelerator device) to push or pull data from different available virtual pools. The logic may use the load balancing logic, resiliency logic, and/or home function decoder to determine what physical pool or pools the corresponding requests should be sent to. Additionally, the memory controller(s) in each pool may be extended to expose push and pull interfaces to the NICs. The push and pull interfaces may also expose parameters usable to specify performance targets (e.g., latency, bandwidth, etc.). Additionally, the memory controller(s) may include logic that manages the physical pools that are used to store data to be utilized by the different VNFs or services. Each of the pools may be implemented as a first-in, first-out (FIFO) queue or data flow. However, the memory controller(s) may include a mechanism usable to sort or process requests in a particular order (e.g., sort the queue data by priority or by a performance target associated with the function or tenant associated with the function).

Figure 9:
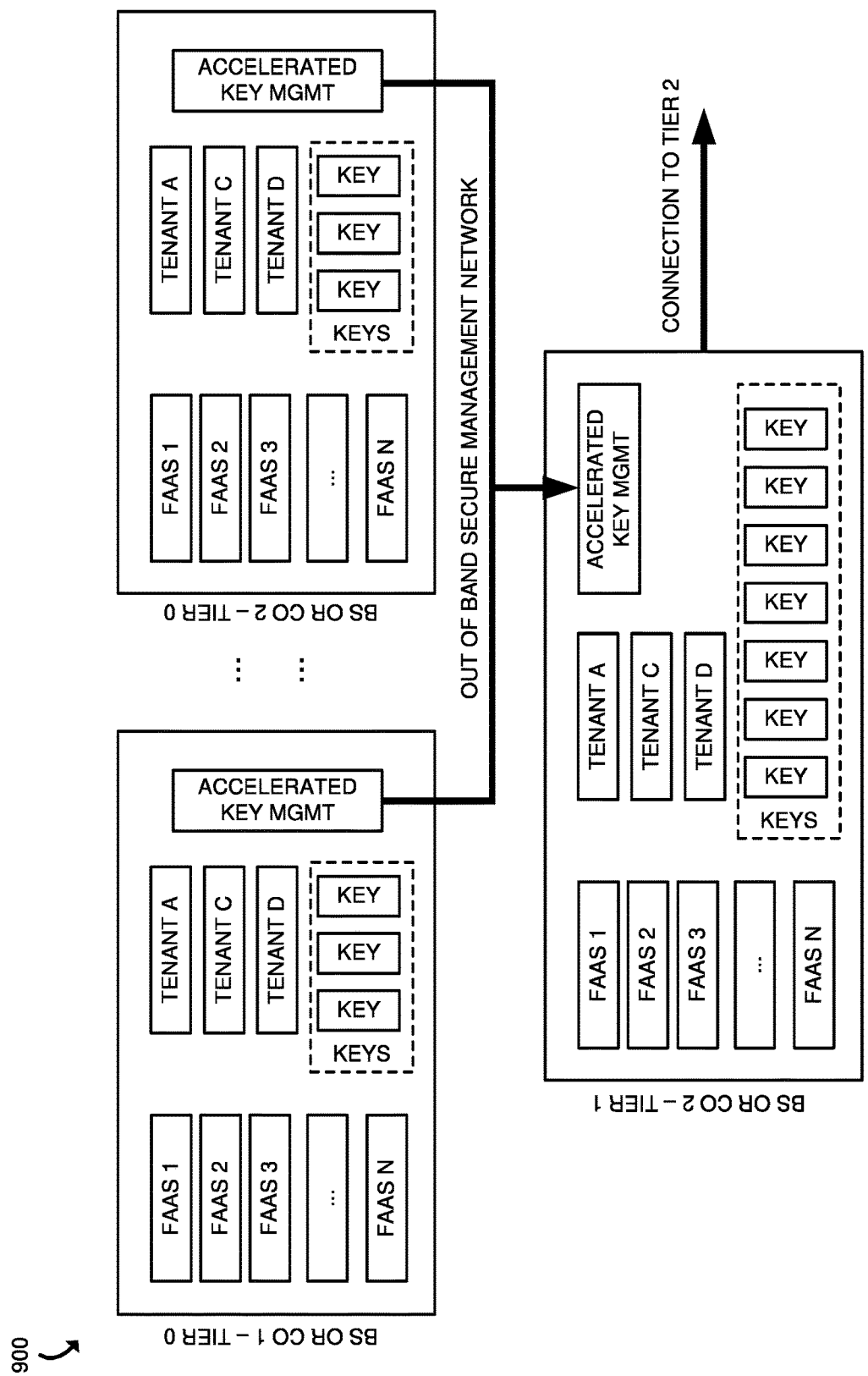
FIG. 9 is a simplified diagram of an architecture of the system of FIG. 1 including tenant key management components.
Figure 10:
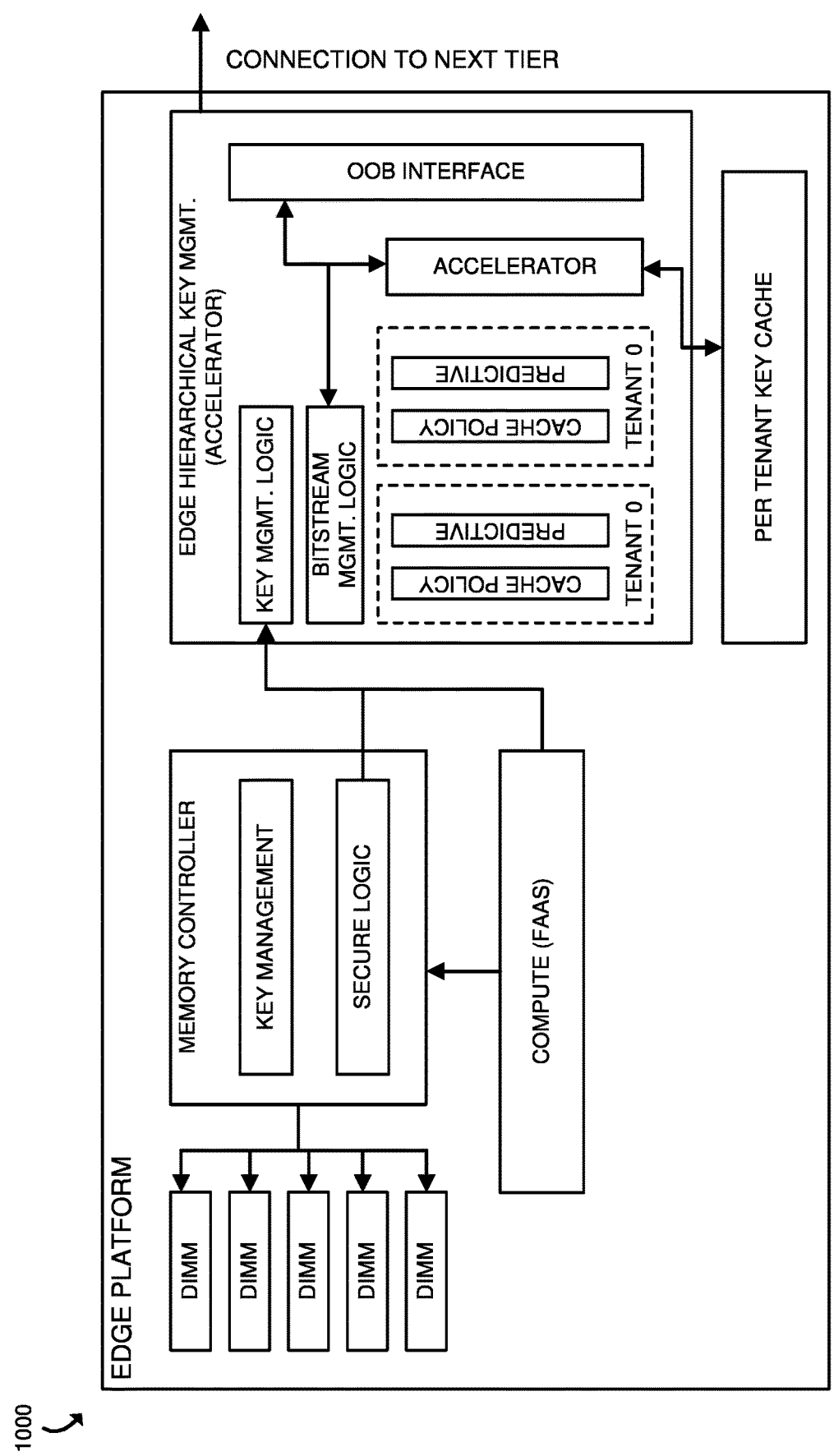
FIG. 10 is a simplified diagram of a subcomponents of a platform of the system of FIG. 1 to manage tenant keys.

Referring now to FIGS. 9 and 10, the architectures 900, 1000 of the system 100 utilize hierarchical key (e.g., tenant key) storage caching schemes that are managed by accelerated compute elements and that are connected via an out of band (OOB) secure management network. In the architectures 900, 1000, each tier of the hierarchy may include a separate storage device that is usable to securely store tenant keys on a per-tenant basis. The tenant keys cannot be accessed in-band and only the FaaS being executed by a particular tenant (e.g., with the corresponding credentials) can access the tenant key(s). In some embodiments, different key management policies may be implemented for each tenant. In addition, an accelerated logic (e.g., FPGA or other accelerator device) is responsible for managing the cache of tenant keys. If a cache miss for a particular required tenant key occurs in the local cache, the accelerated logic sends a request to the next tier and to a set of preconfigured peers in the present tier. Additionally, a set of out of band interfaces may be used by a system software stack to manage the hierarchical scheme, to register new tenant keys and to provide different priorities or hints to tenant keys to be stored. Further, two accelerated function units (e.g., accelerator devices) may be configured per tenant. That is, each tenant can register to run their customized functions to manage (i) tenant key caching policies (e.g., what tenant keys to evict and how) and (ii) predictive functions to identify tenant keys that should be uploaded from other tiers.

Still referring to the architectures 900, 1000 of FIGS. 9 and 10, each platform (e.g., compute, storage, memory, or acceleration platforms) includes an edge hierarchical key management element (e.g., similar to the key management logic unit 144 of FIG. 1) that is configured to (i) manage key caches; (ii) manage different bit streams per tenant that are to be used to control the eviction and prediction schemes per tenant; and (iii) provide interfaces that enable access to the tenant keys. Additionally, the memory controller(s) and compute elements (e.g., compute resources) have access to the tenant keys through extensions that enable interaction with hierarchical key management services and/or accelerated function units (e.g., accelerator devices). In the illustrative embodiment, a device that requests access to the tenant keys must have a valid certificate or other credential(s) to obtain access to the tenant keys. Additionally, the out of band network (e.g., the out of band network 136) enables communication between different edge key management entities of the same tier and other tiers. In some embodiments, as a safety measure, the bit streams that a tenant can deploy in the architectures 900, 1000 to manage the tenant keys do not have access to the tenant keys themselves (e.g., cannot read or write to them). The bit streams may define key eviction policies and accelerated functions for speculative (e.g., predictive prefetching of keys, as described above. The key eviction policies may determine what tenant keys can be evicted from the cache. Eviction may happen when a cache slot needs to be made available for a tenant key that will come from a device in the present tier (e.g., a peer) or from another tier. A key eviction policy may be aware of the tenant keys that are presently stored in the cache for the tenant and how those tenant keys are being used. The accelerated functions for speculative prefetching of keys is usable to determine tenant keys that should be obtained from another tier because they are likely to be used in the near future. Such an algorithm may determine, for example, that FaaS 1 is being executed by user X and that, based on a historical pattern of usage, it is likely that FaaS 2 will be executed by user Y, so the corresponding tenant key should be prefetched.

In some embodiments of the architectures 900, 1000, a set of out of band interfaces can be accessed only by the system software stack (e.g., a management software stack) to configure the hierarchical key caching schemes. Additionally, the architectures 900, 1000 include an interface that enables registration and de-registration of bit streams (e.g., per tenant) as described above. The bit streams, which define the accelerated functions discussed above, may operate on different information (e.g., telemetry data for a platform, resources on the platform that are associated with a particular owner identifier, actions of users of a particular FaaS, etc.). The system 100 may utilize a default function if a tenant has not provided tenant-specific bit streams defining an accelerated function for evicting tenant keys or for speculatively fetching tenant keys. In the architectures 900, 1000, a storage or memory cache used to store tenant keys includes an interface to enable access to and eviction of tenant keys. As described above, each tenant may have different priorities or performance targets (e.g., defined in an SLA). The interface enables different performance targets to be defined for accessing tenant keys. For example, for critical services, the interface may enable accesses to the corresponding tenant keys to be performed faster (e.g., with lower latency) than they would otherwise be performed (e.g., by prioritizing those access requests over other access requests). Additionally, an interface is provided to enable allocation and management of the portion of the cache that is used to store tenant keys for a particular tenant.

Figure 11:
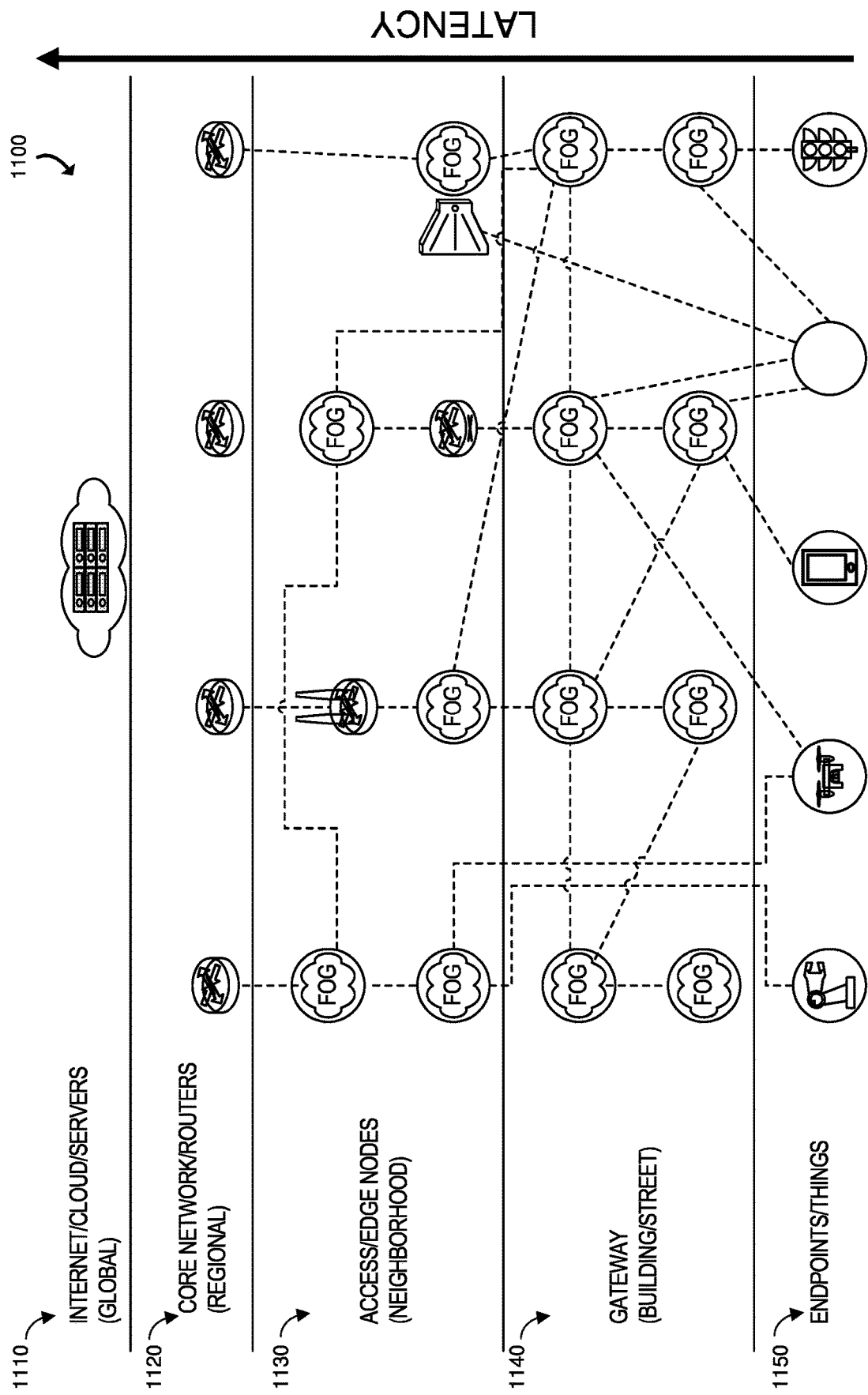
FIG. 11 is a simplified block diagram of a fog and mobile edge computing (MEC) network topology that may be utilized with the system of FIG. 1.

Referring briefly to FIG. 11, a MEC and fog network topology 1100 is shown. The network topology 1100 includes endpoints (at an endpoints/things network layer 1150), gateways (at a gateway layer 1140), access or edge computing nodes (e.g., at neighborhood nodes layer 1130), core network or routers (e.g., at a regional or central office layer 1120), and internet or cloud servers at a global layer 1110. A fog network (e.g., established at the gateway layer 1140) may represent a dense geographical distribution of near-user edge devices (e.g., fog nodes), equipped with storage capabilities (e.g., to avoid the need to store data in cloud data centers), communication capabilities (e.g., rather than routed over an internet backbone), control capabilities, configuration capabilities, measurement and management capabilities (rather than controlled primarily by network gateways such as those in an LTE core network), among others. In this context, FIG. 11 illustrates a general architecture that integrates a number of MEC and fog nodes—categorized in different layers (based on their position, connectivity and processing capabilities, etc.). It will be understood, however, that such fog nodes may be replaced or augmented by edge computing processing nodes.

Fog nodes may be categorized depending on the topology and the layer where they are located. In contrast, from a MEC standard perspective, each fog node may be considered as a mobile edge (ME) Host, or a simple entity hosting a ME app and a light-weighted ME Platform. In an example, a MEC or fog node may be defined as an application instance, connected to or running on a device (ME Host) that is hosting a ME Platform. As such, the application may consume MEC services and be associated to a ME Host in the system. The nodes may be migrated, associated to different ME Hosts, or consume MEC services from other (e.g., local or remote) ME platforms.

In contrast to using the edge, as described above, a traditional application may rely on remote cloud data storage and processing to exchange and coordinate information. A cloud data arrangement allows for long-term data collection and storage, but is not optimal for highly time varying data and may fail in attempting to meet latency challenges (e.g., stopping a vehicle when a child runs into the street). The use of the edge resources as described above enable providing services (e.g., execution of functions) in a low-latency manner (e.g., if requested), and, in some embodiments, may utilize features in existing MEC services that provide minimal overhead.

In addition to the MEC implementation described above, it should be appreciated that the foregoing systems and methods may be implemented in any environment (e.g., smart factories, smart cities, smart buildings, and the like) in which the devices are arranged and interoperate in a manner similar to that described with reference to FIG. 1, though the names of the individual devices may differ from one implementation to the next. For example, in a smart factory, the above systems and methods may improve the accuracy, efficiency, and/or safety with which one or more manufacturing operations are performed, particularly in instances in which the operations are to be performed in real time or near real time (e.g., in which low latency is of high importance). In a smart city, the above systems and methods may improve the accuracy, efficiency, and/or safety in the operation of traffic control systems, environmental monitoring systems, and/or other automated or semi-automated systems. Likewise, in a smart building, the above disclosure may be applied to improve the operations of any systems that rely on sensors to collect and act upon the collected information (e.g., threat detection and evacuation management systems, video monitoring systems, elevator control systems, etc.).

In some embodiments, one or more entities in the system 100, such as requests, parameters of requests, the edge gateways 120, 122, the data access management logic units 140, 142, the key management logic units 144, 146, the platforms 150, 152, 154, 156, the tiers, client compute devices, and/or other entities may be embodied as objects (e.g., common information model (CIM) objects, etc.). An object may be embodied as a set of data that defines parameters or characteristics of an entity. In some embodiments objects may be entities or collections of entities that are network addressable or have a unique identity (e.g., a certificate) or a group identity (e.g., a collection of resources that are working together and that are known to external entities as a collection with a common group name).

EXAMPLES

Illustrative examples of the technologies disclosed herein are provided below. An embodiment of the technologies may include any one or more, and any combination of, the examples described below.

Example 1 includes a compute device comprising circuitry to identify pools of resources that are usable to access data at an edge location; receive a request to execute a function at an edge location, wherein the request identifies a data access performance target for the function; and map, based on a data access performance of each pool and the data access performance target of the function, the function to a set of the pools to satisfy the data access performance target.

Example 2 includes the subject matter of Example 1, and wherein to map the function to a set of the pools comprises to map the function to a virtual pool that has communication lanes to two or more of the pools of resources to obtain a combined bandwidth that satisfies the data access performance target.

Example 3 includes the subject matter of any of Examples 1 and 2, and wherein to receive a request to execute a function comprises to receive a request that includes data indicative of a data resiliency target associated with the function.

Example 4 includes the subject matter of any of Examples 1-3, and wherein to map the function to a set of the pools comprises to map the function to two or more of the pools of resources to satisfy a data resiliency target associated with the function.

Example 5 includes the subject matter of any of Examples 1-4, and wherein the circuitry is further to replicate data associated with the function across the two or more pools of resources that the function is mapped to.

Example 6 includes the subject matter of any of Examples 1-5, and wherein the circuitry is further to route, as a push request or a pull request, a data access request associated with the function to the set pools that the function is mapped to.

Example 7 includes the subject matter of any of Examples 1-6, and wherein to route a data access request comprises to decode an address in the data access request to determine a physical address of a pool mapped to the function.

Example 8 includes the subject matter of any of Examples 1-7, and wherein the circuitry is further to provide, to a memory controller of a pool mapped to the function, data usable to prioritize data access requests associated with the function relative to other data access requests.

Example 9 includes the subject matter of any of Examples 1-8, and wherein the circuitry is further to receive, through an out of band network, a tenant key usable to perform cryptographic operations on data associated with the function.

Example 10 includes the subject matter of any of Examples 1-9, and wherein the circuitry is further to utilize a tenant key to perform cryptographic operations on data associated with the function.

Example 11 includes the subject matter of any of Examples 1-10, and wherein the circuitry is further to obtain the tenant key from a local cache for a tier associated with an edge location of the compute device.

Example 12 includes the subject matter of any of Examples 1-11, and wherein the circuitry is further to determine, using an accelerated predictive function, a tenant key to be obtained from a compute device in a tier that is different from a tier in which the present compute device is located.

Example 13 includes the subject matter of any of Examples 1-12, and wherein to determine, using the accelerated predictive function, a tenant key to be obtained comprises to determine the tenant key to be obtained based on telemetry data indicative of an operational status of resources utilized by the function or data indicative of actions of users of the function.

Example 14 includes the subject matter of any of Examples 1-13, and wherein the circuitry is further to determine, using an accelerated function, whether to evict, from a local cache associated with a present tier of the present compute device, a tenant key usable to perform cryptographic operations; and provide, in response to a determination to evict the tenant key, the tenant key to a compute device in a different tier.

Example 15 includes a method comprising identifying, by a compute device, pools of resources that are usable to access data at an edge location; receiving, by the compute device, a request to execute a function at an edge location, wherein the request identifies a data access performance target for the function; and mapping, by the compute device and based on a data access performance of each pool and the data access performance target of the function, the function to a set of the pools to satisfy the data access performance target.

Example 16 includes the subject matter of Example 15, and wherein mapping the function to a set of the pools comprises mapping the function to a virtual pool that has communication lanes to two or more of the pools of resources to obtain a combined bandwidth that satisfies the data access performance target.

Example 17 includes the subject matter of any of Examples 15 and 16, and wherein receiving a request to execute a function comprises receiving a request that includes data indicative of a data resiliency target associated with the function.

Example 18 includes the subject matter of any of Examples 15-17, and wherein mapping the function to a set of the pools comprises mapping the function to two or more of the pools of resources to satisfy a data resiliency target associated with the function.

Example 19 includes the subject matter of any of Examples 15-18, and further including routing a push request or a pull request that identifies a service level agreement indicative of the data access performance target to the set of pools.

Example 20 includes one or more machine-readable storage media comprising a plurality of instructions stored thereon that, in response to being executed, cause a device to identify pools of resources that are usable to access data at an edge location; receive a request to execute a function at an edge location, wherein the request identifies a data access performance target for the function; and map, based on a data access performance of each pool and the data access performance target of the function, the function to a set of the pools to satisfy the data access performance target.

What is claimed is:

1. A compute device comprising:
   memory;
   instructions; and
   circuitry to execute the instructions to cause the circuitry to:
   identify pools of resources that are usable to access data at an edge location;
   receive a request to execute a function at the edge location, wherein the request identifies a data access performance target for the function; and
   map, based on a data access performance of each pool of the pools of resources and the data access performance target of the function, the function to at least one of (a) a virtual pool that has communication lanes to two or more of the pools of resources to obtain a combined bandwidth that satisfies the data access performance target or (b) two or more of the pools of resources to satisfy a data resiliency target associated with the function.

2. The compute device of claim 1, wherein to receive a request to execute a function, the circuitry is to receive a request that includes data indicative of a data resiliency target associated with the function.

3. The compute device of claim 1, wherein the circuitry is further to replicate data associated with the function across the two or more pools of resources that the function is mapped to.

4. The compute device of claim 1, wherein the circuitry is further to route, as a push request or a pull request, a data access request associated with the function to the pools of resources to which the function is mapped.

5. The compute device of claim 4, wherein to route a data access request, the circuitry is to decode an address in the data access request to determine a physical address of a pool mapped to the function.

6. The compute device of claim 5, wherein the circuitry is further to provide, to a memory controller of a pool mapped to the function, data usable to prioritize data access requests associated with the function relative to other data access requests.

7. The compute device of claim 1, wherein the circuitry is further to receive, through an out of band network, a tenant key usable to perform cryptographic operations on data associated with the function.

8. The compute device of claim 1, wherein the circuitry is further to utilize a tenant key to perform cryptographic operations on data associated with the function.

9. The compute device of claim 8, wherein the circuitry is further to obtain the tenant key from a local cache for a tier associated with the edge location of the compute device.

10. The compute device of claim 1, wherein the circuitry is further to determine, using an accelerated predictive function, a tenant key to be obtained from a separate compute device in a tier that is different from a tier in which the compute device is located.

11. The compute device of claim 10, wherein to determine, using the accelerated predictive function, a tenant key to be obtained includes to determine the tenant key to be obtained based on telemetry data indicative of an operational status of resources utilized by the function or data indicative of actions of users of the function.

12. The compute device of claim 1, wherein the circuitry is further to:
   determine, using an accelerated function, whether to evict, from a local cache associated with a present tier of the compute device, a tenant key usable to perform cryptographic operations; and
   provide, in response to a determination to evict the tenant key, the tenant key to a compute device in a different tier.

13. A method comprising:
   identifying, by a compute device, pools of resources that are usable to access data at an edge location;
   receiving, by the compute device, a request to execute a function at the edge location, wherein the request identifies a data access performance target for the function; and
   mapping, by the compute device and based on a data access performance of each pool of the pools of resources and the data access performance target of the function, the function to one of a virtual pool that has communication lanes to two or more of the pools of resources to obtain a combined bandwidth that satisfies the data access performance target or to two or more of the pools of resources to satisfy a data resiliency target associated with the function.

14. The method of claim 13, wherein receiving the request to execute a function includes receiving a request that includes data indicative of a data resiliency target associated with the function.

15. The method of claim 13, further including routing a push request or a pull request that identifies a service level agreement indicative of the data access performance target to the pools of resources.

16. One or more non-transitory machine-readable storage media comprising a plurality of instructions stored thereon that, in response to being executed, cause a device to:
   identify pools of resources that are usable to access data at an edge location;
   receive a request to execute a function at the edge location, wherein the request identifies a data access performance target for the function; and
   map, based on a data access performance of each pool of the pools of resources and the data access performance target of the function, the function to one of a virtual pool that has communication lanes to two or more of the pools of resources to obtain a combined bandwidth that satisfies the data access performance target or to two or more of the pools of resources to satisfy a data resiliency target associated with the function.

17. The one or more non-transitory machine-readable storage media of claim 16, wherein the plurality of instructions cause the device to receive a request that includes data indicative of a data resiliency target associated with the function.

18. The one or more non-transitory machine-readable storage media of claim 16, wherein the plurality of instructions cause the device to route a push request or a pull request that identifies a service level agreement indicative of the data access performance target to the pools of resources.

19. The one or more non-transitory machine-readable storage media of claim 18, wherein the plurality of instructions cause the device to decode an address in the push request or the pull request to determine a physical address of a pool mapped to the function.

20. The one or more non-transitory machine-readable storage media of claim 19, wherein the plurality of instructions cause the device to provide, to a memory controller of a pool mapped to the function, data usable to prioritize data access requests associated with the function relative to other data access requests.

21. A compute device comprising:
   memory;
   instructions; and
   circuitry to execute the instructions to cause the circuitry to at least:
   identify pools of resources that are usable to access data at an edge location;
   receive a request to execute a function at the edge location, wherein the request identifies a data access performance target for the function;
   map, based on a data access performance of each pool of the pools of resources and the data access performance target of the function, the function to a set of the pools of resources to satisfy the data access performance target; and
   route, as a push request or a pull request, a data access request associated with the function to the set pools of resources that the function is mapped to, wherein to route the data access request, the circuitry is to decode an address in the data access request to determine a physical address of a pool mapped to the function.

22. The compute device of claim 21, wherein to receive the request to execute the function includes, the circuitry is to receive a request that includes data indicative of a data resiliency target associated with the function.

23. The compute device of claim 21, wherein the circuitry is further to provide, to a memory controller of a pool mapped to the function, data usable to prioritize data access requests associated with the function relative to other data access requests.

24. The compute device of claim 21, wherein the circuitry is further to utilize a tenant key to perform cryptographic operations on data associated with the function.

25. The compute device of claim 24, wherein the circuitry is further to obtain the tenant key from a local cache for a tier associated with the edge location of the compute device.

* * * * *